INVENTOR.
LOU A. GRUENEWAELDER

BY Alfred W Petchaft

ATTORNEY

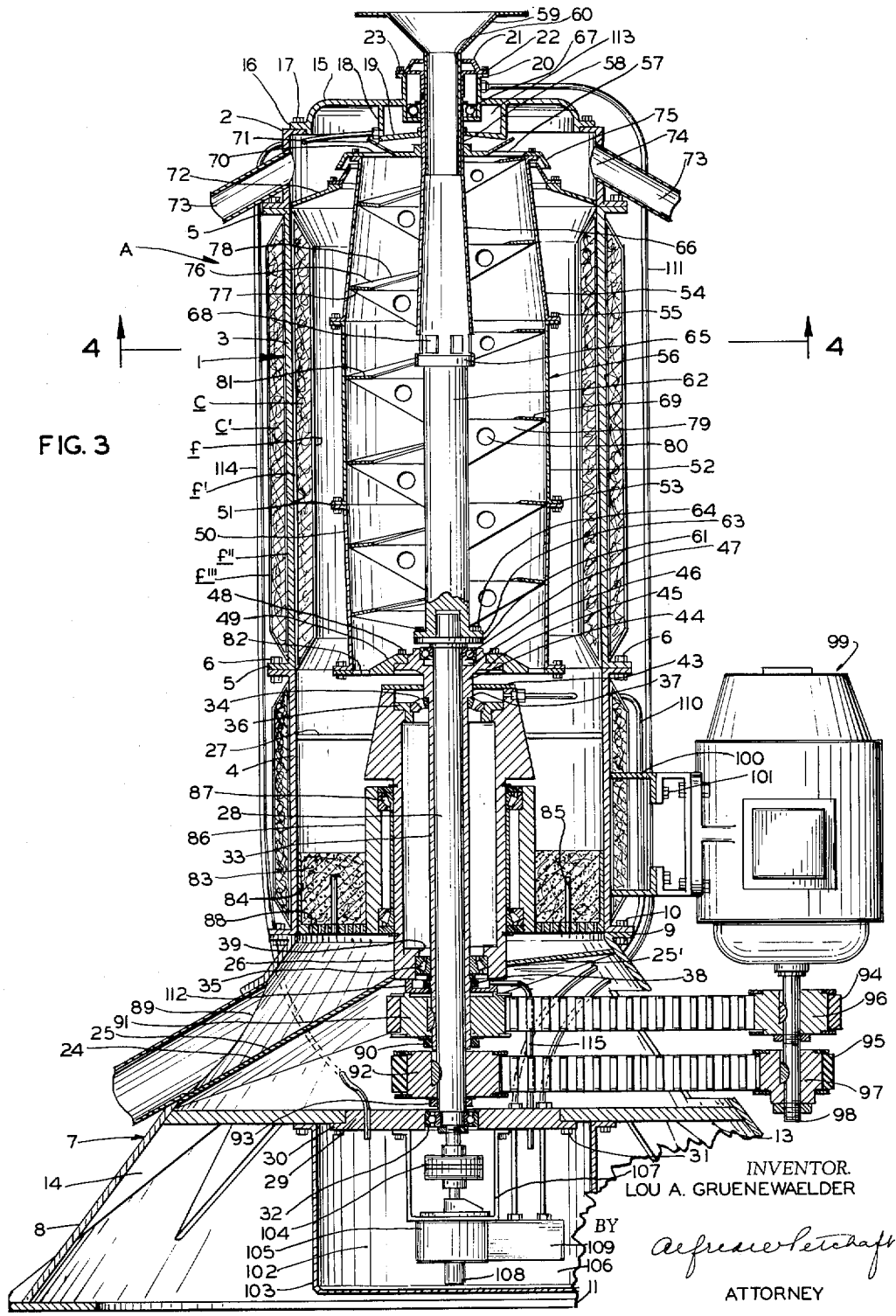

United States Patent Office 3,260,369
Patented July 12, 1966

3,260,369
MEANS FOR CENTRIFUGALLY CLARIFYING WATER CONTAINING SEWAGE SLUDGES AND THE LIKE
Lou A. Gruenewaelder, 6917 Pershing Ave., University City, Mo.
Filed Dec. 14, 1962, Ser. No. 244,754
12 Claims. (Cl. 210—297)

This invention relates in general to certain new and useful improvements in apparatus for purifying water containing sewage sludge and, more particularly, to apparatus which separates entrained solids from a liquid by continuous centrifugal action.

The pollution of the nation's rivers, lakes and waterways has become a matter of growing concern. Today, most of the rivers and inland waterways of this country and many industrialized countries are being increasingly diluted with sewage sludges and industrial waste from cities and large industrial plants. Most of the large cities which are located along inland waterways depend upon these waterways for their source of water and also for a method of disposing of sewage. Generally speaking, most of the cities have some type of continuous sewer system which eventually drains into the inland waterways, and hence use the inland waters to carry away the sewage. This, of course, presents a rather serious health problem, and the river then becomes a source or breeding media for various harmful bacteria, such as the typhoid germ. Additionally, for those cities which are located downstream and rely upon the stream or river for their source of water, this presents a problem of purification.

In order to alleviate this problem, many cities have developed a system of extracting the solid sewage from waste water before injecting the waste water into a by-passing stream or river. This system generally consists of a series of sewage or sedimentation tanks which collect the waste water and upon the addition of a proper chemical agent, such as aluminum hydroxide, will permit precipitation of the solid material. This system is undesirable in that there is no effective device or means provided for eliminating undesirable odors. Moreover, the solid material is deposited on the bottom of the tank and this, of course, requires constant removal. As a result thereof, these tanks must constantly be shut down and continually cleaned out.

The second cause of river and water polution resides in the disposal of industrial wastes by large manufacturing organizations. This is especially true in the case of the chemical industry. Many large industries, such as the chemical and steel industries, usually locate their manufacturing plants along some source of inland water so that they may tap this source to fulfill their need for industrial water and as a method of disposing of industrial waste. This again creates a health problem in the manner as the disposal of sewage created a health problem. Moreover, the disposal of industrial waste into waterways usually presents a conservation problem. Many of the industrial waste are either strongly alkali or strongly acid, or contian some poison or substance which is harmful to the fish which inhabit this stream of water.

Many of the industrial organizations, and some of the municipalities located along the waterway have attempted to install various separating devices for removing the sludge from the waste water before injecting the waste water into the moving stream. While this does somewhat alleviate the problem by removing the solid sludges, this does not eliminate the health and conservation problems, as there have been no effective means for purifying the waste water which is draining into the waterway.

It is, therefore, the primary object of the present invention to provide a centrifugally operated clarifier for removing sewage sludge and industrial waste which is entrained in waste water.

It is another object of the persent invention to provide a device for separating solids from liquids with a high capacity and which maintains a high degree of separation.

It is an additional object of the present invention to provide an apparatus of the type stated which will clarify large quantities of water in a minimum amount of time and with a minimum amount of required power.

It is also an object of the present invention to provide a device for separating and collecting useful solids from a waste liquid vehicle.

It is another salient object of the present invention to provide an apparatus of the type stated which will not only remove solid sewage and industrial waste from a stream of waste water, but will additionally purify such stream of waste water.

With the above and other objects in view, my invention resides in the novel features of form, construction, arrangement, and combination of parts presently described and pointed out in the claims.

In the accompanying drawings (four sheets)—

FIG. 3 is an enlarged vertical sectional view taken along line 3—3 of FIG. 2;

Figure 1:
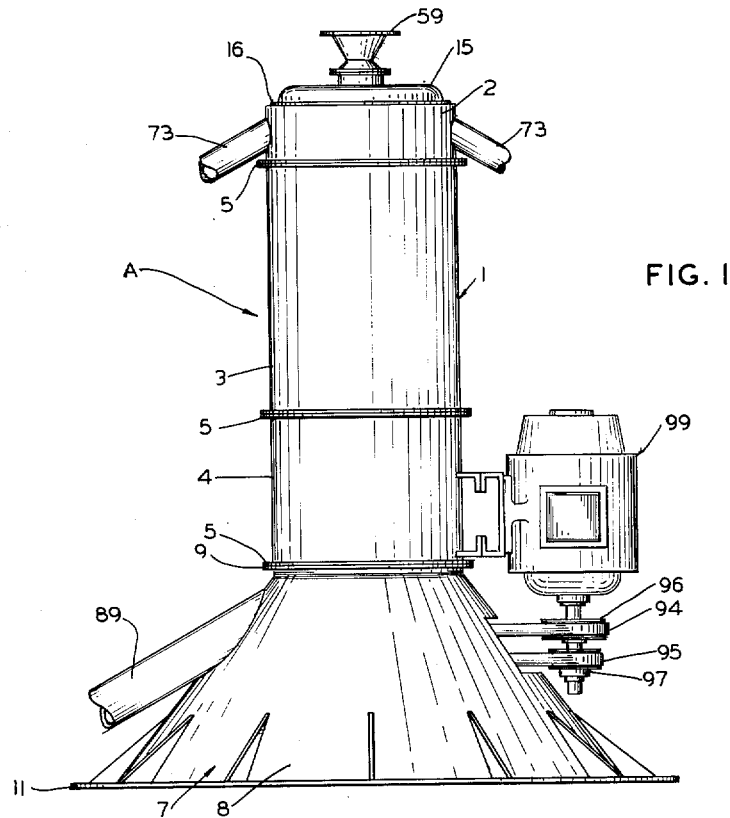
FIG. 1 is a side elevational view of a centrifugally operated clarifier constructed in accordance with and embodying the present invention.
Figure 2:
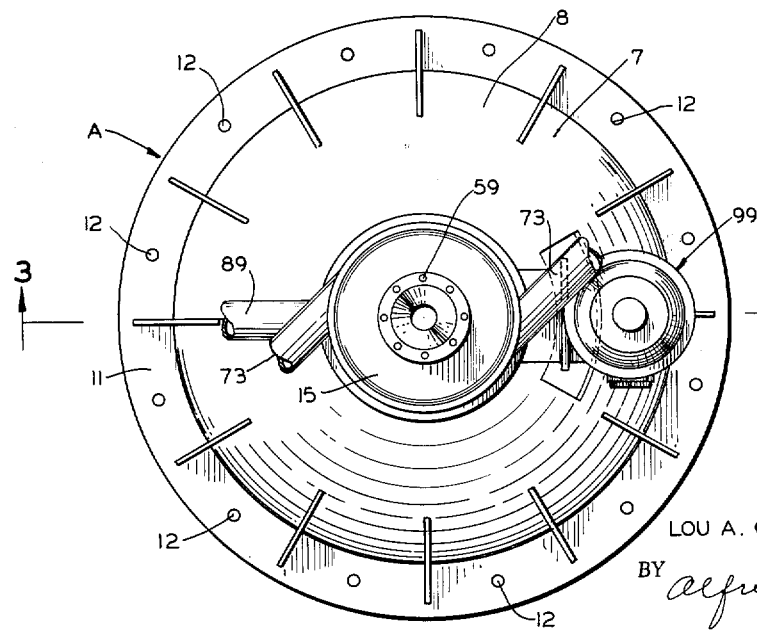
FIG. 2 is a top plan view of the clarifier of FIG. 1.

Generally speaking, the present invention resides in a centrifugal separator having a long cylindrical housing which is provided at its upper end with a funnel for receiving a waste water influent or throughput. The waste water will normally contain sewage sludge or some type of similar industrial waste. Rotatably mounted internally of the housing, and communicating with the funnel, is a series of vertically registering bowls which are designed to receive the influent or throughput. Rotatably mounted within the bowls is a shaft having a helical conveyor.

As the throughput comes into contact with the helical conveyor, the solids are separated from the liquid by a centrifugal action and forced upwardly through the action of the blade. Meanwhile, the water which consequently been freed of the entrained solids, passes through the apertures formed in the lower portion of the lowermost bowl. Also rotatably mounted within the housing is a filter media through which the water having the entrained solids removed will pass. After passing through the filter media, the water which is freed from the entrained solids and has been partially purified, will then pass into a liquid disposal for drainage into a river or similar waterway.

The apparatus of the present invention also includes an oil reservoir and oil pump for providing each of the bearings contained within the apparatus with a continuous supply of lubricating oil. This centrifugal separator is readily adaptable to be combined in tandem or in series with a plurality of like centrifugal separators for obtaining a greater degree of purification or sludge removal.

The present invention also includes an embodiment which employs a stationary filter rather than a rotatably mounted filter, rotated through the turbulence of water passing therethrough. The stationary filter is supported on a conicaly shaped drainage plate. A third embodiment employs a series of impeller-type blades mounted within the bowls rather than a helical conveyor. The series of blades when rotating serves to convey the solid material upwardly within the bowls.

Finally, apparatus of the present invention readily lends itself for convenient connection to like apparatus in order to form a progressive series of centrifuge stages. The original throughput is subjected to repeated centrifugation in order to obtain a better degree of separation.

Referring now in more detail and by reference characters to the drawings, A designates a centrifugal clarifier having an outer housing 1 which consists of three endwise connected vertically registered sections 2, 3, 4, each having annular flanges 5 at their upper and lower ends for bolted securement to each other through bolts 6. Bolted to the lower annular flange 5 of the lower most section 4 is a cylindrical support frame 7 having an annular side wall 8 which integrally merges at its upper end into an annular flange 9 matching the lowermost annular flange 5 and is sized to accommodate bolts 10. The annular side wall 8 is bolted or otherwise rigidly secured to a lower base plate 11 which includes apertures 12 for accommodating any suitable fastener, not shown, whereby the base plate 11 can be rigidly secured to any suitable support means. Welded to the interior surface of the annular side wall 8 intermediate its upper and lower ends is an intermediate horizontal support plate 13 which is reinforced by a set of gussets 14, the latter being welded to the underside of the support plate 13 and to the interior surface of the side wall 8. Rigidly secured to the upper annular flange 5 of the uppermost section 2 is a top cover plate 15 having an annular flange 16 which registers with the flange 5 for accommodating bolts 17. The top cover plate 15 is centrally apertured and integrally merges into a vertical wall 18 having a cylindrical cross-section, and which at its lower end integrally merges into a relatively flat bottom wall 19. The vertical wall 18 is integrally formed with an annular flange 20 at its upper end for supporting a circular cap 21, also having an annular flange 22 for accommodating bolts 23. The entire interior surface of the housing 1 is coated on its interior surface with a one-half inch thick rigid polyurethane coating material $c$ in order to reduce vibration during the rotation thereof. The upper surface of the polyurethane material $c$ is covered with a thin sheet of lead or aluminum foil $f$ having a thickness of approximately .003 to .005 inch. A second sheet of thin lead or aluminum foil $f'$ similar to the sheet $f$ is interposed between the interior surface of the housing 1 and the coating of polyurethane material $c$. The foil $f'$ is applied to the interior surface of the housing 1 by a suitable adhesive, such as water-resistant latex material. The foil $f'$ is secured to the interior surface of the coating material $c$ and the coating material $c$ is secured to the interior surface of the foil $f$ by means of the above-mentioned adhesive material. A sheet of lead foil $f''$ having a thickness of .0015 inch is secured to the exterior surface of the housing 1 by a suitable epoxy resin adhesive and is followed by two inches of a rigid polyurethane foam material $c'$. Finally, adhesively secured to the exterior surface of the foam material $c'$ by the epoxy resin adhesive is an outer sheet of lead foil $f''$ also having a thickness of .0015 inch. These coatings of rigid polyurethane foam sandwiched between lead foil has been found to be very effective in reducing vibration and sound.

Welded or otherwise rigidly secured to the interior surface of the annular side wall 8 and to the upper surface of the horizontal support plate 13 is a drainage plate 24 having a downwardly and outwardly tapering side wall 25 and a relatively flat wall 25' and is centrally apertured at its upper end for supporting a stationary support block 26. The support block 26 is further reinforced in the housing 1 by means of a spider frame 27 which is welded to the block 26 and to the interior walls of the lowermost section 4. The stationary support block 26 is axially bored to accommodate a rotatable drive shaft 28. The horizontal support plate 13 is centrally apertured for accommodating a circular bearing retaining plate 29, the latter having an integrally formed annular flange 30 which engages the underside of the support plate 13 and is secured thereto by means of bolts 31. The bearing retaining plate 29 is centrally apertured for accommodating bearings 32 which engage a turned-down portion of the rotatable shaft 28, thereby rotatably supporting the drive shaft 28 in a vertical position within the outer housing 1.

Concentrically disposed about the rotatable shaft 28 and extending axially therealong is a rotatable quill shaft 33, which is journaled in upper and lower bearings 34, 35, respectively. The upper bearings 34 are retained by an annular ring 36 and a shoulder 37 formed on the quill shaft. The lower bearing 35 is supported by a lock nut 38 and an annular shoulder 39 formed in the bore of the support block 26. Rigidly secured to the upper end of the stationary support block 26 is a horizontal sealing plate 43 which is centrally apertured for accommodating the quill shaft 33 and drive shaft 28.

The quill shaft 33 is integrally formed with a diametrally enlarged head 44 at its upper end which, in turn, integrally merges into an outwardly extending support flange 45. The enlarged head 44 is provided with a cup-shaped recess 46 for retaining bearings 47, and thereby journaling the rotatable drive shaft 28 at its upper end within the quill shaft 33. Rigidly secured to the outwardly extending flange 45 by means of bolts 48 is a lower closure plate 49 which supports a lower conically shaped bowl 50, the latter being provided with upper and lower annular flanges 51 for bolted engagement to the closure plate 49. Bolted or otherwise rigidly secured to the upper flange 51 is a cylindrical center bowl 52 having upper and lower annular flanges 53, and secured to the upper flange 53 of the central bowl 52 is an upper conically shaped bowl 54 also having upper and lower integrally formed annular flanges 55. A suitable sealing agent is coated on the undersurface and upper surface of the matching flanges 51, 53, 55, to provide a liquid tight-seal. By reference to FIG. 3, it can be seen that the center bowl 52 has a relatively straight cylindrical side wall while the side wall of the lower bowl 50 tapers downwardly and inwardly. Moreover, the side wall of the upper bowl 54 tapers inwardly and upwardly. The three bowls 50, 52, 54, are vertically registered, thereby forming a centrifuge casing 56 having a barrel-shaped configuration. By means of the above-outlined construction, it can be seen that the quill shaft 33 and the centrifuge casing 56 will rotate with respect to the rotatable shaft 28. Rigidly secured to the upper annular flange 55 of the upper bowl 54 is a top closure plate 57 which is centrally apertured, and concentrically disposed therearound is an upstanding guide sleeve 58 for accommodating the stem of an influent funnel 59, which also extends through axially aligned apertures 60, formed within the bottom wall 19 and the cap 21.

For optimum results, it has been found that the side walls of the upper bowl 54 should taper inwardly at an angle within the range of 7 to 21° with respect to the vertical or axis of rotation, and the side walls of the lower bowl 50 should taper inwardly at an angle within the range of 3 to 7° with respect to the vertical or axis of rotation. The degree of inclination of the side walls of the upper and lower bowls 54, 50, respectively, is dependent upon and affected by the condition of the influent or feed material. Where the influent contains a large solid content, the angle of taper of the bowls 50, 54, will be less than when the influent contains a smaller amount of solid content.

The various bowls 50, 52, 54, are preferably constructed of steel, gray iron, aluminum, magnesium, or are molded from a carbonate resin. If the bowls 50, 52, 54, are constructed of the latter material, then a suitable bacteriostatic inhibitor is incorporated during the molding thereof. If, however, the bowls 50, 52, 54, are constructed of any of the aforementioned metals, their interior surfaces should be sand-blasted in order to provide a porous finish which is readily capable of receiving a suitable bacteriostatic inhibitor, the latter to be hereinafter described. These bacteriostatic inhibitors should be able to withstand a temperature of up to 500° F. The most suitable bacteriostatic inhibitors thus found are methyl dodecyl benzyl trimethyl ammonium chloride and methyl dodecyl xylylene bis trimethyl ammonium chloride, and alkyl dimethyl benzyl ammonium chloride. Actually, the bacteriostatic inhibitors should be incorporated in a soluble polyethylene plastic material when the latter is in a liquid state. This liquid polyethylene plastic can then be sprayed or painted on the sand-blasted surface and is hardened to form a suitable bacteriostatic coating which will not readily lend itself to abrasion or washing away from the influent. It has also been found that a vinyl chloride-acrylate resin or a chlorinated polyethylene material could be used as a carrier in place of polyethylene to hold the bacteriostatic inhibitor. These latter materials more readily lend themselves to withstanding the effects of high temperature. It is also possible to construct the bowls from a molded phenolic material or a melamine material, which inherently has a high impact strength and, moreover, is capable of directly accommodating the bacteriostatic inhibitor directly during the molding thereof. The most effective coating has been found to have a thickness of approximately .003 inch.

The rotatable drive shaft 28 is integrally formed with an annular support flange 61 slightly beneath its upper margin and bolted thereto is a rotor shaft 62 which is also integrally formed with a matching annular flange 63 for accommodating bolts 64. The rotor shaft 62 is reamed out from its lower end to provide a bore which is sized to accommodate an upper end of the rotatable drive shaft 28, all as can best be seen in FIG. 3. The rotor shaft 62 extends axially through the centrifuge casing 56, for approximately half the vertical length thereof, and is integrally provided at its upper end with an outwardly flaring flange 65 for supporting an influent intake tube 66, the latter concentrically encircling the stem of the funnel 59 and extending through the aperture 60 formed within the bottom wall 19 where it is rotatably journaled in bearings 67, the latter being supported by the bottom wall 19. The lower end of the intake tube 66 is formed with four relatively large annularly spaced discharge ports 68 which will discharge the influent from the influent funnel 59 into the interior portion of the centrifuge casing 56.

As the influent is introduced into the interior portion of the centrifuge casing 56, the sludge is separated from the water where it is carried upwardly within the casing 56 by means of a conveyor 69 and the sludge is thereupon ejected from the casing 56 through discharge apertures 70 formed within the top closure plate 57. Guide flanges 71 are integrally formed with or welded to the upwardly presented surface of the closure plate 57 for directing the concentrated slude onto a conveyor plate 72, the latter being secured to the exterior portions of the upper bowl 54 where the sludge is then directed into a plurality of outwardly and downwardly extending discharge chutes 73, the latter being secured to the exterior portion of the outer housing 1 and communicating with the interior portions thereof through apertures 74. The closure plate 57 is integrally formed with an annular down-struck lip 75 for directing the concentrated sludge from the discharge apertures 70 onto the conveyor plate 72. If desired, a set of infra red heat lamps (not shown) can be mounted on the interior surface of the top cover plate 15 with its light rays directed on the apertures 70 for providing a media which is capable of rapidly destroying bacteria in the solid sludge as it is ejected from the centrifuge casing 56. These heat lamps, of course, are connected to a suitable source of electric current through a cord set. Since this construction, however, is conventional and in no way forms part of the present invention, it is neither illustrated nor described in detail herein. Mounted on the underside of the intermediate horizontal support plate 13 is a second set of infra red lamps (not shown) which have their light beams directed downwardly toward the drainage plate 24 for providing a media which effectively destroys any remaining bacteria within the clarified liquid. The lower lamps are also provided with cord sets for connection to a suitable source of electric current (not shown). Obviously, the above-described lamps should be mounted within water-tight sockets.

The conveyor 69 consists of a screw-type helical blade 76 which is disposed around and entirely encompasses the rotor shaft 62 for its entire length. The blade is sized so that its peripheral margin barely clears the interior walls of the bowls 50, 52, 54. The blade 76 consists of a flat spirally wound portion 77 having a large vertical channel or central bore 78, so that there are discontinuous areas between the shaft 62 and the blade 76. The blade 76 is secured to the shaft during a plurality of gussets 79 which are provided with apertures 80.

The upwardly presented surface of the flat spirally wound portion 77 is preferably provided with a cobalt screen 81 which serves as a bacteriostatic inhibitor. Since the lighter materials, namely the solids, will collect on the outer radial portion of the conveyor blade 76, the greater density liquids will collect in an area surrounding the rotor shaft 62. Consequently, the screw-type helical conveyor will force the solid material upwardly within the bowls 50, 52, 54, permitting the liquid to pass down the central bore 78. The speed of the rotor shaft 62, of course, must be regulated according to the solid content and the density thereof in the influent. The speed must be so adjusted so that the light solids will be forced upwardly and the heavier liquids will be permitted to fall to the bottom of the centrifuge casing 56. For example, it has been found that for an influent of 155 gallons per minute containing a solid content of 476 parts per million that a rotor speed of 3500 r.p.m. gave optimum results with a bowl diameter of fourteen inches. The effluent or output only contained 198 parts per million of solids.

In addition to the cobalt screens 81, the upper surfaces of the spirally wound portion 77 could be coated with a bactericidal inhibitor such as the inhibitor used in coating the interior surface of the centrifuge casing 56. Moreover, it is desirable to apply this bactericidal inhibitor to the exterior surfaces of the rotor shaft 62 and of the intake tube 66. Similarly, the bactericidal inhibitor should be applied to the discharge chutes 73 and any other portion of the clarifier A which remains in continual contact with the sludge separated from the water.

Continual separation will concentrate the sludge at the upper end of the bowl 54 and the water which has been clarified by removal of the major portions of the entrained solids will pass through discharge apertures 82 formed in the lower closure plate 49 where it will then pass into a rotating filter 83. The filter 83 is retained by a rotatable filter cup 84 having an upstanding flange 85 for retaining the filter 83 in a rather rigid position within the cup 84. The filter cup 84 is secured to a rotatable sleeve 86, the latter being rotatably mounted upon the stationary support block 26 through bearings 87. Moreover, it can be seen by reference to FIG. 3 that the filter cup 84 is annular about the sleeve 86 and is sized to rotate within the housing 1 with a minimum amount of clearance between the outer surface of the cup 84 and the interior surface of the housing 1, and yet with sufficient clearance so as to provide friction free rotation.

The filter which has been found to be most suitable is constructed from foamed polyurethane sponge with approximately 2.0 to 5.0 percent of micronized activated carbon, and about 2.0 to 5.0 percent of a suitable quaternary ammonium compound. Among the quaternary ammonium compounds which can be used in the present invention are dodecyl dimethyl benzyl ammonium naphthenate, cetyl dimethyl benzyl ammonium naphthenates, 9-octadecenyl dimethyl ethyl ammonium naphthenate, tetraethyl ammonium naphthenate, dimethyl ethyl propyl ammonium naphthenate, N (lauric acid ester of colamino-formyl methyl)dimethyl ammonium naphthenate, and N-alkybenzyl trimethyl ammonium naphthenates, such as N-dodecylbenzyl trimethyl ammonium naphthenate. One of the most useful and practical quaternary ammonium compounds and the one found preferable for the present invention is di-isobutyl phenoxy ethyl dimethyl benzyl ammonium chloride monohydrate, together with a dimethyl silicone oil to impart heat resistance to the cells of the foam. After the clarified water has passed through the filter 83, where most of the harmful bacteria has been removed, it will pass through apertures 88 formed in the bottom wall of the filter cup 84, and continue on to the drainage plate 24, where it will pass through apertures 89 formed in the annular side wall 8 of the support frame 7. Water can then be carried to the drainage ditch or stream by any suitable chute, not shown.

In connection with the present invention, it has been found that the clarified water which passes through the discharge aperture 82 is sufficient in velocity and quantity to rotate the filter 83. Actually, the angular velocity of rotation of the filter 83 is proportionate to the amount and velocity of the throughput.

Mounted on the lower end of the rotatable quill shaft 33 and retained thereon by a lock washer 90 is a gear belt pulley 91 and mounted on the rotatable drive shaft 28 immediately beneath the pulley 91 is a gear belt pulley 92 which is retained by a lock washer 93. The pulleys 91, 92, are driven through a set of drive belts 94, 95, and which are trained about drive pulleys 96, 97, respectively, each of which is mounted on a drive shaft 98 of a variable speed explosion proof electric motor 99. The electric motor 99 is secured to a bracket 100 through bolts 101, the bracket 100 being welded or otherwise rigidly secured to the exterior surface of the outer housing 1, in the manner as shown in FIG. 1. The pulleys 91, 96, 92, 97, should be of such diameter that the speed ratio between the pulleys 92, 97, exceeds the speed ratio between the pulleys 91, 96, so that the conveyor 76 will rotate at a higher angular velocity than the centrifuge casing 56. Moreover, it can be seen that a proportionate differential of speed between the conveyor blades 76 and the casing 56 will always be maintained even though the speed of the variable speed electric motor 99 may be changed. A difference of 65 r.p.m. between the centrifuge casing 56 and the speed of the rotor shaft 62 at a centrifuge casing speed of 3500 r.p.m. has been found to produce optimum results.

The rotatable drive shaft 28 extends downwardly through the bearings 32 in the bearing retaining plate 29, into an oil reservoir 102 formed by a reservoir casing 103 bolted to the underside of the horizontal support plate 13. The lower end of the rotatable shaft 28 is connected through a coupling 104, to a pump 105, which communicates with a bath of lubricating oil 106, the pump 105 being secured to the underside of the support plate 13 through a bracket 107. The pump 105 is provided with an intake 108 which communicates with the bath of lubricating oil 106, and in operation pumps lubricating oil into a high-pressure manifold 109 which communicates with the bearings 34, 67, through oil supply lines 110, 111, respectively. The lower bearing 35 is lubricated with the oil that passes through the bearing 34 and moves through the bore of the stationary support block 26. The excess oil from the bearings 34, 35, falls into an oil cup 112 which is disposed about the shaft 28 and is secured to the underside of the support block 26. The excess oil which is delivered to the bearings 67 drains into an oil cup 113 formed on the underside of the top cover plate 15 and which is connected to the oil reservoir 102 through an oil return line 114. The oil cup 112 is connected to the reservoir 102 through an oil return line 115. Thus, it can be seen that each of the bearings 34, 35, 67, are continually lubricated during the operation of the centrifugal clarifier A.

In use, the variable speed electric motor 99 is connected to some suitable source of alternating electrical current for rotating the drive pulleys 96, 97. As a result thereof, through the action of the drive belts 94, 95, the pulleys 91, 92, will rotate the quill shaft 33 and the rotatable drive shaft 28. As this occurs, the rotatable quill shaft 33 will rotate the centrifuge casing 56 and the rotatable drive shaft 28 will rotate the rotor shaft 62 and the intake tube 66, which in turn operates the conveyor 69. It should be noted that as the rotatable drive shaft 28 is continually rotating, it will operate the hydraulic pump 105 which will, in turn, supply lubricating oil to the bearings 34, 35, 67, by continued lubrication thereof in the manner as previously described.

The influent or feed material may consist of water which carries entrained industrial waste or sewage and is delivered to the influent funnel 59 where it will be discharged into the interior portion of the centrifuge casing 56 through the discharge ports 68 formed in the intake tube 66. It should be noted that the intake is not discharged into the interior portion of the centrifuge casing 56 at its upper end, but rather at a point approximately one-third of the distance from the upper margin thereof. The influent is then subjected to the action of centrifugal separation through the rapidly rotating conveyor blade 76. At this point of discharge into the casing 56, the greatest degree of separation will take place. The entrained solids will, therefore, be separated from the liquid vehicle, where they will be carried upwardly through the action of the blades 76. Actually, some of the solid portions will accumulate on the inside walls of the various bowls 50, 52, 54, where they will be subjected to further dehydrating action, and transported upwardly through the action of the blades 76. Finally, the solids will be discharged through the discharge apertures 70, over the guide flange 71, and onto the discharge chutes 73. The water will be subject to the bacteriological action of the bacteriostatic inhibitor which is provided on the interior surface of the casing 56 and of the blades 76. Moreover, the water will pass through the apertures 82 and into the rotating filter 83. After passing through the filter 83, the water will collect on the drainage plate 24 and for ultimate discharge into a source of moving water such as a river or stream.

Figure 5:
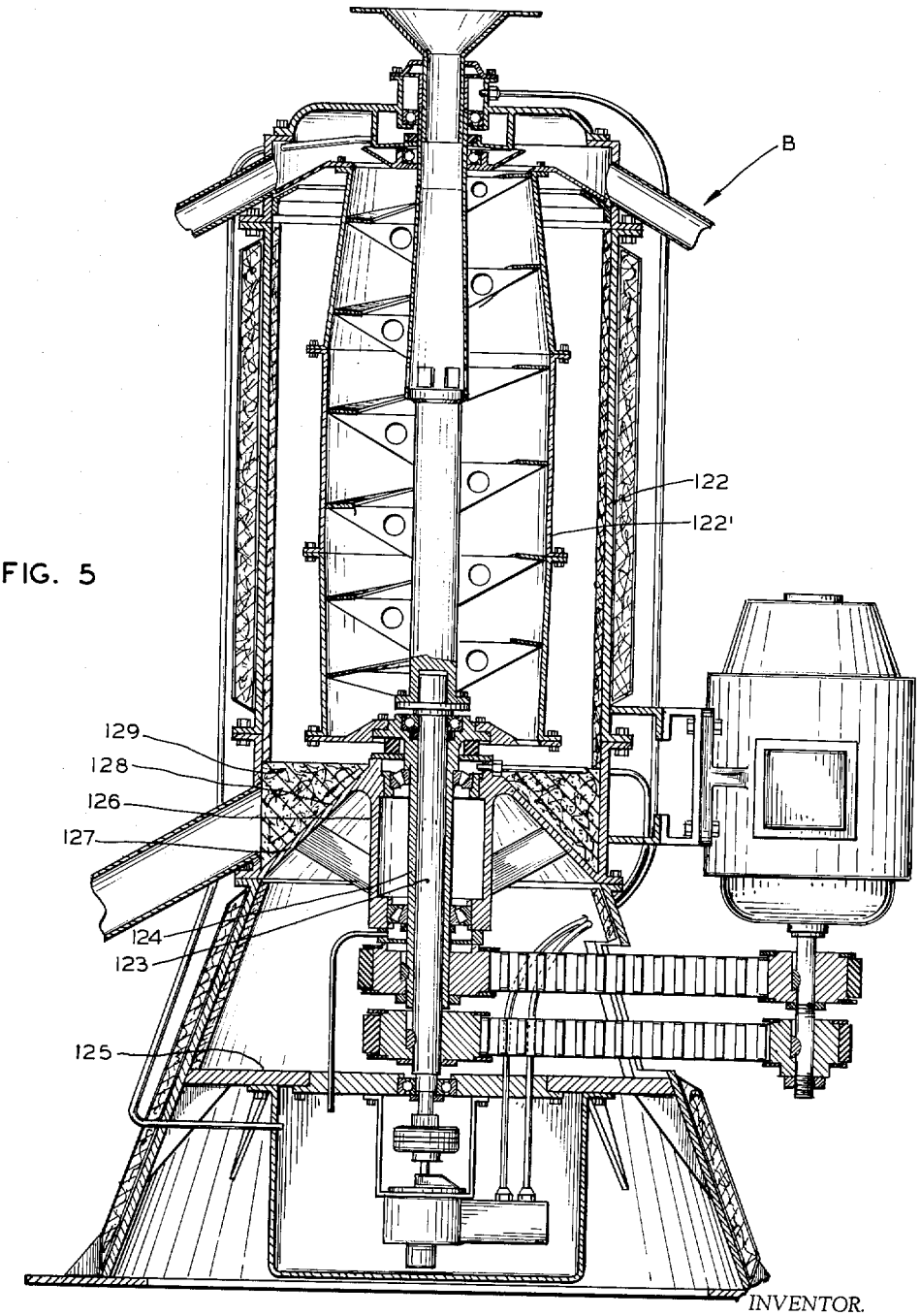
FIG. 5 is a vertical sectional view of a modified form of clarifier constructed in accordance with and embodying the present invention.

It is also possible to provide a modified form of centrifugal clarifier B substantially as shown in FIG. 5 and which is substantially similar to the previously described clarifier A, but does not employ a filter cup for retaining the filter. The centrifugal clarifier B includes an outer housing 122, a centrifuge casing 122′, and a rotatable drive shaft 123, the latter being journaled and driven in the manner as described in connection with the centrigual clarifier A. The centrifugal clarifier B is provided with a rotatable quill shaft 124 which is concentrically disposed about the drive shaft 123 and supporting the centrifuge casing 122′. The housing 122 is also provided with a horizontal support plate 125. Operatively mounted within the housing 122 and being concentrically disposed about the quill shaft 124 is a stationary support block 126. Welded or otherwise rigidly secured to the upper end of the support block 126 is a conically shaped drainage plate 127 having a downwardly and outwardly tapered side wall 128. The support block 126 is axially bored in order to accommodate the rotatable drive shaft 123 and the quill shaft 124.

Blown into the area formed by the tapered side wall 127 and the interior surface of the housing 122 is a foamed polyurethane sponge filter 129 containing approximately 2.0 to 5.0 perecnt of micronized activated carbon and approximately 2.0 to 5.0 percent of a suitable quaternary ammonium compound. The quaternary ammonium compound is used in connection with the present filter or among the class listed for those used in connection with the filter 83 of the clarifier A.

It can thus be seen that the clarifier B is provided with a stationary filter, thereby eliminating the filter cup which was employed in the clarifier A. The remainder of the clarifier B is substantially identical to the construction of the clarifier A and is, therefore, neither illustrated nor described in detail herein. It should be noted, however, that due to the above-described constructions, it is possible to materially reduce the length of the drive shaft 123 in the clarifier B due to the fact that the length of the shaft for supporting the filter cup has been eliminated.

Figure 6:
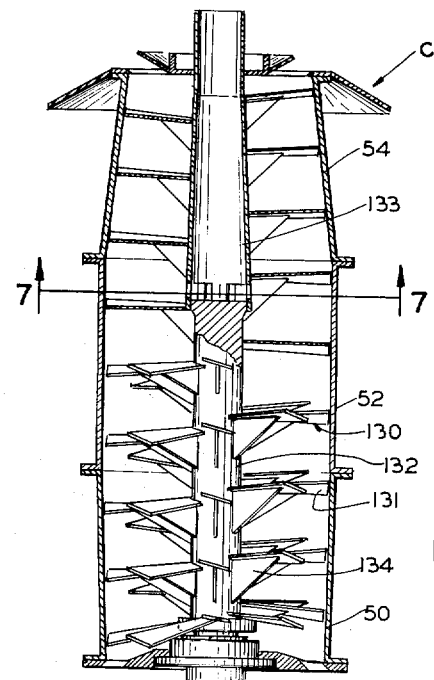
FIG. 6 is a vertical sectional view partly broken away of another modified form of clarifier constructed in accordance with and embodying the present invention.
Figure 4:
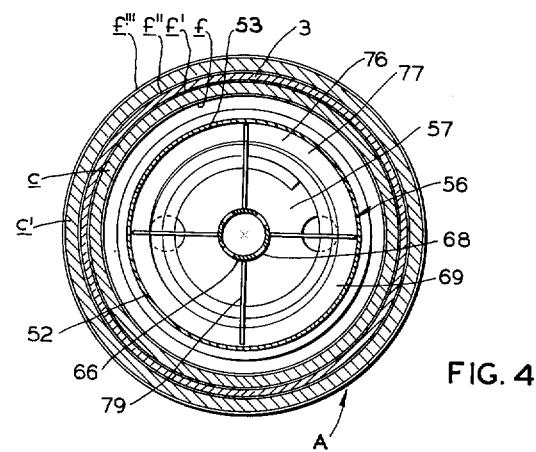
FIG. 4 is a fragmentary sectional view taken along along line 4—4 of FIG. 3.
Figure 7:
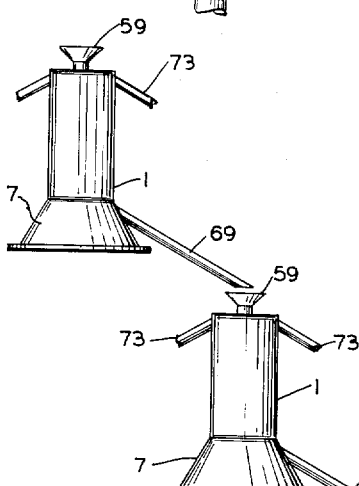
FIG. 7 is a horizontal sectional view taken along line 7—7 of FIG. 6.

It is possible to provide another modified form of centrifugal clarifier C substantially as shown in FIGS. 6 and 7 and which is substantially similar to clarifier A. The clarifier C, however, does not employ the screw-type helical conveyor used in the clarifier A and clarifier B. The clarifier C includes a conveyor 130 consisting of a plurality of conveyor flights or impeller blades 131 which are welded to or otherwise secured to a rotor shaft 132 and intake tube 133 and are further reinforced by a plurality of gussets 134. The rotor shaft 132 and intake tube 133 are substantially identical to the previously described rotor shaft 62 and intake tube 66, respectively. Each of the impeller blades 131 are radially spaced with respect to the blade immediately thereabove so that they, in effect, extend around the shaft 132 in a three-hundred and sixty degree area. Moreover, each blade 131 is mounted slightly below the blade from which it is radially spaced so that all of the blades, in effect, give the appearance of forming a spiral about the shaft 132. Furthermore, each of the blades 131 are tilted so that they lie within a plane which is located at approximately 7° with respect to the horizontal. By reference to FIG. 6 it can be seen that the leading edge of each of the blades 131 is pointed downwardly, whereas the trailing edge of each of the blades 131 is directed upwardly, when they are rotating in a counterclockwise direction, reference being made to FIG. 3. It should also be obvious by reference to FIG. 6 that the pitch of the various blades 131 progressively changes with respect to their position on the rotor shaft 132 and the intake tube 133. Thus, the uppermost impeller blades 131 have leading edges which are directed downwardly and trailing edges which are directed upwardly. Progressing downwardly along the shaft 132, the leading edge of the next lower impeller blade 31 is directed downwardly at a lesser angle than the leading edge of the uppermost impeller blade 131. Progressing downwardly to the bottom of the rotor shaft 132, the angle of pitch has changed so that the leading edge of the lowermost impeller blade 131 is directed upwardly whereas the trailing edge is directed downwardly.

This degree of tilt of the various blades 131 should not exceed an angle of 40° with respect to the horizontal and should not be less than 5° with respect to the horizontal. These degrees of inclination have been found to be most suitable, taken with the various degrees of tapering of the upper and lower bowls 50, 54, respectively. Actually, this degree of tilt is dependent upon the percentage and density of solids in the throughput. Where the influent contains a solid material having relatively high density, the angle that the leading edges of the blades 131 form with respect to the horizontal will be greater than when the influent has a solid content of lesser density. The impeller blades 131 can also be provided on their upwardly presented surfaces with cobalt screens (not shown) which serve as a bacteriostatic inhibitor. The exterior surfaces of the rotor shaft 132 of the intake tube 133 of the impeller blades 131 should preferably be coated with a bacteriostatic inhibitor such as the inhibitor used in coating the interior surface of the centrifuge casing 56.

As the influent is injected into the centrifuge casing 56, the impeller blades 131 through centrifugal action will cause the lighter solids to separate from the heavier water, and force the solids upwardly. In this connection, it should be noted that as the impeller blades 131 are directed downwardly toward the left, reference being made to FIG. 6, that the rotor shaft 132 and intake tube 133 will rotate in a counterclockwise direction. Thus, it can be seen that as the sludge or solid matter is being forced upwardly, the water will drain therefrom downwardly through the various bowls 50, 52, and 54.

Figure 8:
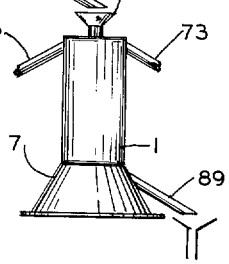
FIG. 8 is a diagrammatic view of a plurality of connected centrifugal clarifiers forming a series of clarification stages.

It is possible to connect a plurality of any of the above-described centrifugal clarifiers A, B, or C, in series to form a number of stages of clarification, substantially as shown in FIG. 8. This is desirable in cases where the waste water contains high solid content. In such cases where a high degree of clarification is desired and it is undesirable to build unduly large clarifiers of the types described, a plurality of the clarifiers A, B, or C could be connected in series as shown. In this case, the solid discharge from each of the clarifiers A, B, or C, will be collected for disposal. The liquid discharge from the first clarifier is cycled to the input of the second clarifier, the liquid discharge of the second clarifier is cycled to the input of the third clarifier, and so on. In each of the successive stages, a high degree of clarification is attained.

It should be understood that changes and modifications in the form, construction, arrangement, and combination of the several parts of the means and methods for centrifugally clarifying water containing sewage sludges and the like, and in the steps of its production, may be made and substituted for those herein shown and described without departing from the nature and principle of my invention.

Having thus described my invention, what I claim and desire to secure by Letters Patent is:

1. A device for clarifying water and similar liquids containing solid matter, said device comprising base means, a first vertical rotatable shaft operatively mounted on said base means, a helical conveyor element secured to said first rotatable shaft and being rotatable therewith, a second rotatable shaft operatively mounted on said base means, an outer casing rigidly secured to said second rotatable shaft and enclosing said helical conveyor element, said helical conveyor element having an outer margin located in close proximity to the inwardly presented surface of said casing and an inner margin located in outwardly spaced relation to the first shaft so as to form a vertical channel therebetween, said inner marging being substantially unobstructed and in continuous communication with the vertical channel for its entire length so that liquids can spill off of said conveyor element into said channel while solids are conveyed away thereon, intake means operatively mounted on said base means and opening into said casing for injecting said liquids containing solid matter into the casing where said solid matter will be separated from the liquid by the rotating action of said helical conveyor element, means on said casing for causing the solid matter to be ejected outwardly therefrom, means on said casing for causing the clarified liquid to be ejected outwardly therefrom, said last-named means being in communication with said vertical channel, and means for rotating said first and second shafts.

2. A device for clarifying water and similar liquids containing solid matter, said device comprising base means, a first vertical rotatable shaft operatively mounted on said base means, a helical conveyor element secured to said first rotatable shaft and being rotatable therewith, a second rotatable shaft operatively mounted on said base means, an outer casing rigidly secured to said second rotatable shaft and enclosing said helical conveyor element, said helical conveyor element having an outer margin located in close proximity to the inwardly presented surface of said casing and an inner margin located in outwardly spaced relation to the first shaft so as to form a vertical channel therebetween, said first shaft being tubular for a portion of its length and provided with apertures which establish communication between said tubular portion and said channel, an intake mounted on said base means and being in communication with said tubular portion of said first shaft whereby when a liquid containing solid matter is introduced into said intake it will enter the tubular portion of the first shaft and be ejected therefrom through said apertures onto said conveyor element, said inner margin of the conveyor element being substantially unobstructed and in continuous communication with the vertical channel along its entire length so that clarified liquids can spill off of said conveyor while solids are conveyed away thereon, means for rotating the first shaft so that the solid matter will be separated from the liquid by the rotating action of said helical conveyor element, means for rotating the second shaft at an angular velocity which is less than the angular velocity of the first shaft, means on said casing for causing the solid matter to be ejected out of the upper end thereof, and means on said casing for causing the clarified liquid to be ejected out of the lower end thereof, said last-named means being in communication with said channel.

3. A device for clarifying water and similar liquids containing solid matter, said device comprising base means, a first vertical rotatable shaft operatively mounted on said base means, a helical conveyor element secured to said first rotatable shaft and being rotatable therewith, a second rotatable shaft operatively mounted on said base means, an outer casing rigidly secured to said second rotatable shaft and enclosing said helical conveyor element, said helical conveyor element having an outer margin located in close proximity to the inwardly presented surface of said casing and an inner margin located in outwardly spaced relation to the first shaft so as to form a vertical channel therebetween, said inner margin being substantially unobstructed and in continuous communication with the vertical channel for its entire length so that liquids can spill off of said conveyor element into said channel while solids are conveyed away thereon, intake means operatively mounted on said base means and opening into said casing for injecting said liquids containing solid matter into the casing where said solid matter will be separated from the liquid by the rotating action of said helical conveyor element, means on said casing for causing the solid matter to be ejected out of the upper end thereof, means on said casing for causing the clarified liquid to be ejected out of the lower end thereof, said last-named means being in communication with said vertical channel, means for rotating said first and second shafts, and a germicidal filter operatively mounted on the underside of said casing so that liquids ejected from said channel will pass through said filter.

4. A device for clarifying water and similar liquids containing solid matter, said device comprising base means, a rotatable vertical shaft operatively mounted on said base means, a rotatable quill shaft operatively mounted on said base means and extending axially along said rotatable vertical shaft, a rotatable casing operatively mounted on said quill shaft and being rotatable therewith, a helical conveyor element mounted on said rotatable vertical shaft and being located within said casing, said helical conveyor element having an outer margin located in close proximity to the inwardly presented surface of the casing and an inner margin located in outwardly spaced relation to said rotatable vertical shaft so as to form a vertical channel therebetween, said rotatable vertical shaft having an upwardly opening internal bore and being provided with apertures which establish communication between said bore and said channel, an outer housing operatively mounted on said base means and enclosing said casing and rotatable shafts therein, liquid intake means mounted on said housing and communicating with said internal bore for injecting liquids containing solid matter through said apertures and into said casing, where said solid matter will be separated from the liquid by the rotating action of said helical conveyor element, said inner margin of the conveyor element being substantially unobstructed and in continuous communication with said channel along its entire length so that the clarified liquid can spill off of said element into said channel, said casing having discharge apertures at its upper and lower ends for ejecting solid matter out through the discharge apertures at its upper end and liquid through the discharge apertures at its lower end, means for rotating said rotatable vertical and quill shafts, and a bacteriostatic filter mounted on said rotatable quill shaft in close proximity to the discharge apertures at the lower end of the casing so that liquids passing therethrough will also pass through said filter.

5. A device for clarifying water and similar liquids containing solid matter according to claim 4 in which, said casing is provided on its interior surface and said helical conveyor is provided on its exterior surface with a bacteriostatic inhibitor.

6. A device for clarifying water and similar liquids containing solid matter according to claim 4 in which said casing comprises a conically shaped upper section, a conically shaped lower section, and a cylindrical intermediate section, said upper section having an upwardly and inwardly tapering side wall, said lower section having a downwardly and inwardly tapering side wall.

7. A device for clarifying water and similar liquids containing solid matter, said device comprising base means, a rotatable vertical shaft operatively mounted on said base means, a rotatable quill shaft operatively mounted on said base means and extending axially along said rotatable vertical shaft, a rotatable casing operatively mounted on said quill shaft and being rotatable therewith, said casing consisting of a conically shaped upper section, a conically shaped lower section, and a cylindrical intermediate section, said upper section having an upwardly and inwardly tapering side wall, said lower section having a downwardly and inwardly tapering side wall, the angle of taper of the side wall of said upper section being greater than the angle of taper of the side wall of said lower section, a helical conveyor element mounted on said rotatable vertical shaft and being located within said casing, said helical conveyor element having an outer margin located in close proximity to the inner surface of the casing and an inner margin located in outwardly spaced relation to said rotatable vertical shaft so as to form a vertical channel therebetween, an outer housing operatively mounted on said base means and enclosing said casing and rotatable shafts therein, a funnel mounted on said housing, a hollow tube mounted in coaxial relation to the rotatable vertical shaft and communicating with said funnel at one end and with the vertical channel at its other end whereby liquids containing solid matter are injected into said casing, where said solid matter will be separated from the liquid by the rotating action of the helical conveyor element, said hollow tube extending axially into said casing from the upper end thereof for a distance which is not greater than one-third of its axial length, said inner margin of the conveyor element being substantially unobstructed and in continuous communication with said channel along its entire length so that the clarified liquid can spill off of said element into said channel, said casing having discharge apertures at its upper and lower ends for ejecting solid matter out through the apertures at its upper end and liquid through the apertures at its lower end, means for rotating said shafts, and a bacteriostatic filter mounted on said rotatable quill shaft in close proximity to the discharge apertures at the lower end of the casing so that liquids passing therethrough will also pass through said filter.

8. A device for clarifying water and similar liquids containing solid matter, said device comprising base means, a first rotatable shaft operatively mounted on said base means, a series of blade-like elements secured to said first rotatable shaft and being rotatable therewith, a second rotatable shaft operatively mounted on said base means, an outer casing rigidly secured to said second rotatable shaft and enclosing said blade-like elements, said blade-like elements having an outer margin located in close proximity to the inner surface of the casing and an inner margin located in outwardly spaced relation to said first rotatable shaft so as to form a vertical channel therebetween, said first rotatable shaft having an internal bore and apertures which establish communication between said bore and the interior of said casing, intake means operatively mounted on said base means and opening into said internal bore for injecting said liquids containing solid matter directly onto said blade-like elements in said casing where said solid matter will be separated from the liquid by the action of said rotating blades, said inner margin of the blade-like elements being substantially unobstructed and in continuous communication with said channel along its entire length so that clarified liquid can spill off of said blade-like elements into said channel, means on said casing for causing the solid matter to be ejected outwardly therefrom, means for rotating said first and second rotatable shafts, and means on said casing for causing the clarified liquid to be ejected outwardly therefrom.

9. A device for clarifying water and similar liquids containing solid matter, said device comprising base means, a rotatable vertical shaft operatively mounted on said base means, a rotatable quill shaft operatively mounted on said base means and extending axially along said rotatable vertical shaft, a rotatable casing operatively mounted on said quill shaft and being rotatable therewith, a plurality of blade-like elements mounted on said rotatable vertical shaft and being located within said casing, said blade-like elements having an outer margin located in close proximity to the inner surface of the casing and an inner margin located in outwardly spaced relation to said rotatable vertical shaft so as to form a vertical channel therebetween, said rotatable vertical shaft having an internal bore and apertures which establish communication between said bore and the interior of said casing, said blade-like elements having relatively flat upwardly presented surfaces which are inclined at an angle with respect to the horizontal, an outer housing operatively mounted on said base means and enclosing said casing and rotatable shafts therein, liquid intake means mounted on said housing and communicating with said internal bore for injecting liquids containing solid matter directly onto said blade-like elements in said casing where said solid matter will be separated from the liquid by the action of the rotating blades, said inner margin of the blade-like elements being substantially unobstructed and in continuous communication with said channel along its entire length so that clarified liquid can spill off of said blade-like elements into said channel, said casing having discharge apertures at its upper and lower ends for ejecting solid matter out through the apertures at its upper end and liquid through the apertures at its lower end, means for rotating said rotatable shafts, and a bacteriostatic filter mounted on said rotatable quill shaft in close proximity to the discharge apertures at the lower end of the casing so that liquids passing therethrough will also pass through said filter.

10. A device for clarifying water and similar liquids containing solid matter, said device comprising base means, a rotatable vertical shaft operatively mounted on said base means, a rotatable quill shaft operatively mounted on said base means and extending axially along said rotatable vertical shaft, a rotatable casing operatively mounted on said quill shaft and being rotatable therewith, said casing consisting of a conically shaped upper section, a conically shaped lower section, and a cylindrical intermediate section, said upper section having an upwardly and inwardly tapering side wall, said lower section having a downwardly and inwardly tapering side wall, the angle of taper of the side wall of said upper section being greater than the angle of taper of the side wall of said lower section, a plurality of blade-like elements mounted on said rotatable vertical shaft and being located within said casing, said blade-like elements having an outer margin located in close proximity to the inner surface of the casing and an inner margin located in outwardly spaced relation to said rotatable vertical shaft so as to form a vertical channel therebetween, said blade-like elements being inclined at an angle with respect to the horizontal and having a downwardly presented leading edge and an upwardly presented trailing edge, an outer housing operatively mounted on said base means and enclosing said casing and rotatable shafts therein, a funnel mounted on said housing, a hollow tube mounted coaxial with said rotatable vertical shaft and communicating with said funnel and with the interior portion of said casing for injecting liquids containing solid matter directly onto said blade-like elements in said casing where said solid matter will be separated from the liquid by the action of the rotating blades, said hollow tube extending axially into said casing for a distance which is not greater than one-third of its axial length, said inner margin of the blade-like elements being substantially unobstructed and in continuous communication with said channel along its entire length so that clarified liquid can spill off of said blade-like elements into said channel, said casing having discharge apertures at its upper and lower ends for ejecting solid matter out through the apertures at its upper end and liquid through the apertures at its lower end, means for rotating said rotatable shafts, and a bacteriostatic filter mounted on said rotatable quill shaft in close proximity to the discharge apertures at the lower end of the casing so that liquids passing therethrough will also pass through said filter.

11. A device for clarifying water and similar liquids containing solid matter according to claim 4 and further characterized by a first layer of insulating material secured to the interior surface of said outer housing, and a second layer of insulating material secured to the exterior surface of said outer housing.

12. A device for clarifying water and similar liquids containing solid matter according to claim 4 and further characterized by a first layer of insulating material secured to the interior surface of said outer housing, and a second layer of insulating material secured to the exterior surface of said outer housing, each of said layers of insulating material consisting of a rigid foam element enclosed between outer films of metallic foil.

(References on following page)

References Cited by the Examiner

UNITED STATES PATENTS

| | | | |
|---|---|---|---|
| 1,235,193 | 7/1917 | Elmore | 210—374 X |
| 1,592,717 | 7/1926 | Breneman | 210—380 |
| 1,633,079 | 6/1927 | Engle | 210—64 X |
| 1,988,612 | 1/1935 | Stindt | 210—255 |
| 2,508,602 | 5/1950 | Goetz | 210—64 X |
| 2,567,178 | 10/1953 | Robinson | 210—64 |
| 2,657,179 | 10/1953 | Robinson | 210—64 |
| 2,672,238 | 3/1954 | Walters | 210—297 |
| 2,692,231 | 10/1954 | Stayner et al. | 210—64 |
| 2,820,549 | 1/1958 | Belke | 210—297 |
| 2,961,710 | 11/1960 | Stark | 210—500 X |
| 3,092,582 | 6/1963 | Lacker | 233—2 |
| 3,096,183 | 7/1963 | Genth. | |
| 3,104,225 | 9/1963 | Benedetto. | |
| 3,106,307 | 10/1963 | Morrison. | |
| 3,116,969 | 1/1964 | Coleman. | |

REUBEN FRIEDMAN, *Primary Examiner.*

HARRY B. THORNTON, *Examiner.*

J. DECESARE, S. ZAHARNA, *Assistant Examiners.*